Figure 1:
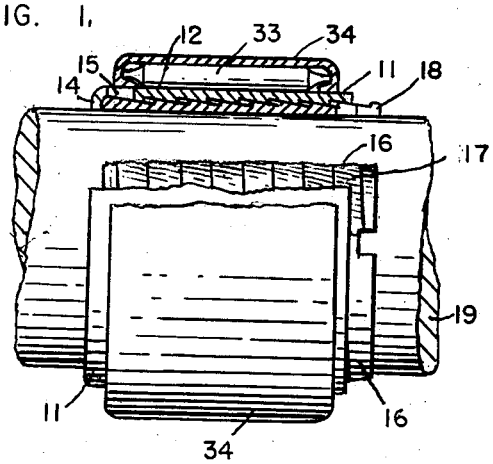

April 14, 1964          C. F. BENSON          3,129,038

SHAFT MOUNTING FOR ROLLER BEARING

Filed Feb. 8, 1962          2 Sheets-Sheet 1

CARL F. BENSON
INVENTOR

BY Mason, Porter, Miller & Stewart

ATTORNEYS

April 14, 1964     C. F. BENSON     3,129,038
SHAFT MOUNTING FOR ROLLER BEARING

Filed Feb. 8, 1962     2 Sheets-Sheet 2

CARL F. BENSON
INVENTOR

BY *Mason, Porter, Miller & Stewart*

ATTORNEYS

United States Patent Office 3,129,038
Patented Apr. 14, 1964

---

3,129,038
SHAFT MOUNTING FOR ROLLER BEARING
Carl F. Benson, Torrington, Conn., assignor to The Torrington Company, Torrington, Conn., a corporation of Maine
Filed Feb. 8, 1962, Ser. No. 172,010
9 Claims. (Cl. 308—236)

The specification following relates to an improved shaft mounting for roller or needle bearings and particularly to a combined inner race and shaft mounting means.

Applications of roller and needle bearings directly to shafts without the use of inner races provide an economical mounting where hardening of the shaft is feasible. When it is not feasible to harden a shaft, hardened inner races must be applied. Further, for economical reasons, users may wish to use unhardened cold rolled shafting without machining or grinding the diameter. This presents the problem of variation in shaft size which for example may vary 0.003 inch in a one inch diameter. This tolerance precludes the use of press fits unless selective fitting is used which is an expensive operation. Loose fitting races are troublesome as scuffing and fretting corrosion occur between the shaft and race. Thick races with end clamping are better, but still are troublesome. Therefore, a race with mounting means on a cold rolled shaft and which supports the inner race throughout most of its length, has wide application.

There are inner races that can be fastened to a shaft and support the race throughout its length. These races have tapered bores with a split matching outside diameter tapered straight bored sleeve having a threaded end. A nut applied to the sleeve and acting against the face of the inner race pulls the tapered sleeve into engagement with the race. The sleeve decreases in diameter and is tightened on the shaft. The nut is then locked in position. Because of the long taper, these pieces are not adaptable to thin radial cross-sections.

The present invention of an inner race adapted to clamp to a shaft uses the principle of the wedge in spiral form. The angle is small and the pitch of the thread is short compared to the long taper of the inner race described above. This then allows a thinner race in which the variation of radial cross-section due to the thread is not great. This therefore allows manufacturing these pieces from rolled sheet metal. In addition, this method of clamping is equally adaptable to the fastening of thick races.

One of the objects of the invention is to provide an improved inner race of thin cross-section, which may be clamped on a cold rolled shaft.

Another object of the invention is to provide an improved inner race which may be clamped on a shaft and which is supported throughout the major length of the race.

A further object of the invention is to provide an improved inner race sleeve combination which may be clamped on a shaft and which utilizes the combination of the wedge and thread to enable fabrication from sheet metal for economical reasons.

Figure 2:
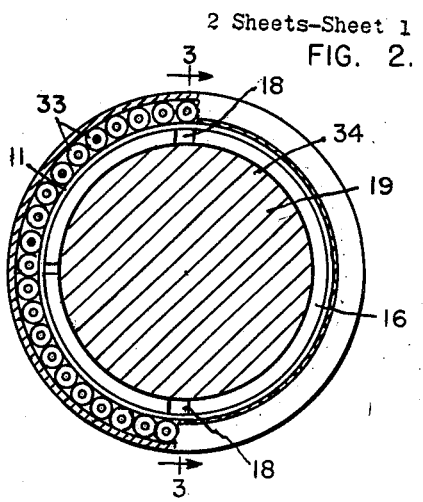
Figure 3:
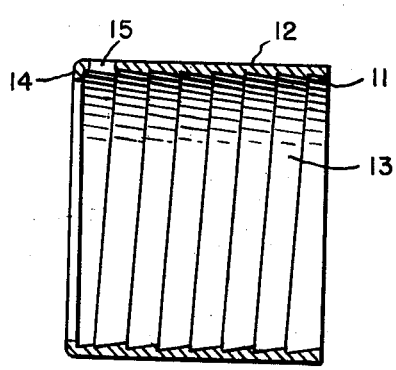
Figure 4:
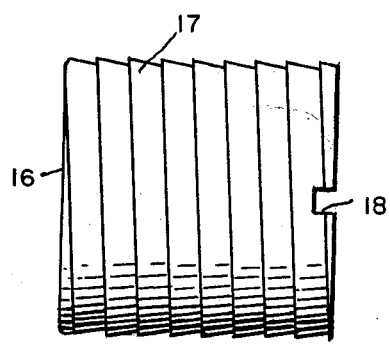
Figure 5:
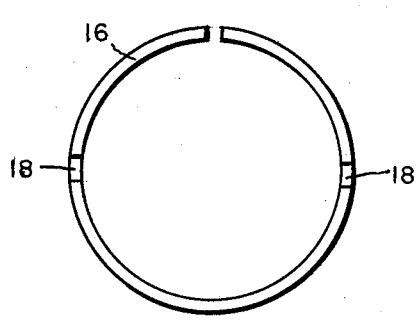
Figure 6:
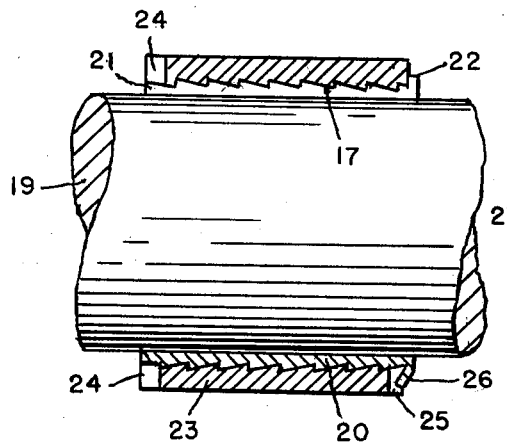
Figure 7:
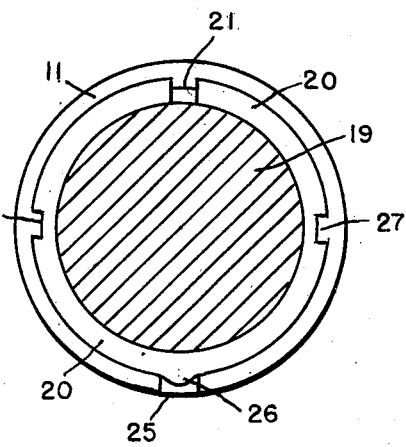
Figure 8:
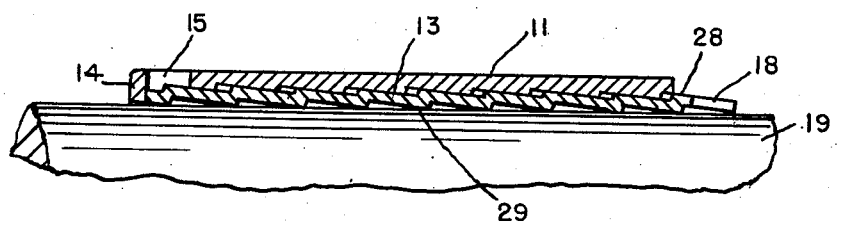
Figure 9:
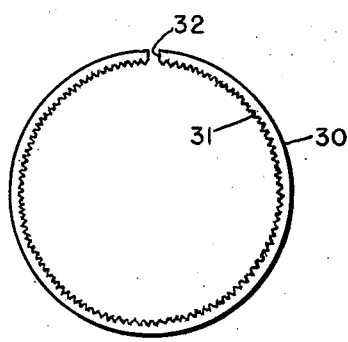

These and other objects will be apparent from the following description of the preferred forms and the accompanying drawings in which:

FIG. 1 is a side elevational view partly in section of a needle bearing assembly with its inner race in place on one form of the mounting sleeve;
FIG. 2 is an end view partly in section of the mounted needle bearing assembly;
FIG. 3 is a vertical side section of the inner race taken on the line 3—3 of FIG. 2;
FIG. 4 is a side elevational view of the shaft sleeve;
FIG. 5 is an end view of the sleeve;
FIG. 6 is a side elevation, partly in section;
FIG. 7 is an end view of the same;
FIG. 8 is an enlarged longitudinal section of the inner race assembled with a modified form of the sleeve and
FIG. 9 is an end view of a further modified sleeve.

Briefly described the improved shaft mounting means comprises in its preferred form an inner race member having a generally cylindrical external diameter with a bore having throughout its length a non-symmetrical low angled wedge shaped helical tooth form and a radial inwardly extending end, a split sleeve within and butting the inner race end having an external helical tooth form conforming to the internal tooth form of the inner race member with a generally cylindrical or helical threaded bore, and spanner hole and slot means on the inner race member to permit its rotation relative to the sleeve to drive the wedge surfaces together, thereby decreasing the sleeve diameter and thus envelop a shaft tightly.

Other modifications vary in the means of holding or grasping the parts for lockup on the shaft or in the case of an inner race of thicker section use of a sleeve with a radial projecting end which to abut.

Specifically referring to the drawings, the improved inner race member consists in one form of an inner race or outer member 11, having a generally cylindrical exterior 12, a non-symmetrical low angled wedge shaped tooth form 13 forming a helix throughout the length of the bore, a radial inwardly extending end flange or abutment 14, and two opposite spanner wrench holes 15 extending through the wall of race adjacent to the radially extending flange 14.

The mounting means consists of a split sleeve 16 having an external thread 17 to mate with the internal thread of the race member. The sleeve has a generally cylindrical interior surface, and two spanner wrench slots 18 diametrically disposed. Sleeve 16 is slotted longitudinally as shown in drawings or may be at an angle with the axis.

Both the race member 11 and the split sleeve 16 may be of light sheet metal suitably hardened.

In the assembly of the bearing mounting, the shaft sleeve 16 is screwed into the race member 11. The slots 18 will be exposed when the opposite end abuts against the radial extending flange 14 of the race member. This assembly will slip easily over a shaft 19. Spanner wrenches are put in the respective holes 15 and slots 18 and relative rotation of the parts tends to drive the sleeve deeper in the inner race member causing tighter wedging because the sleeve abuts against the flange of the race member. This wedging action causes the split sleeve to decrease in diameter until it is clamped tight to the shaft 19. The sleeve may be split longitudinally or obliquely.

According to the modification shown in FIGS. 6 and 7, the sleeve 20 is split longitudinally as at 21. At one end the sleeve has an outwardly extending flange 22. The sleeve has the same helical thread 17.

The sleeve 20 is the same length as the surrounding inner race member 23. Both sleeve and member may be of sheet metal although they are shown of heavy stock suitably machined and hardened.

The race member 23 is slotted diametrically as at 24, 24 to receive a spanner wrench. The opposite end of the race member has one or more recesses 25 to receive a tongue 26 on the flange 22 or receive a peened or bent in portion of flange 22. The flange 22 has diametrical slots 27, 27 to receive a second spanner wrench.

By manipulating the two spanner wrenches the race member rotates relative to the sleeve, drawing up the latter along the helical thread as a wedge. The tongue 26 is then bent into recess 25 or the adjacent portion of flange 22 is peened into recess 25 to lock the parts together and clamp the sleeve 20 to the shaft 19.

According to the form as shown on FIG. 8, the sleeve 28 has the same helical thread form as sleeve 16 but is formed from rolled or stamped sheet metal of uniform thickness. Hence the internal surface is also spirally corrugated to form a continuous helical thread 29. It is of course offset from the external thread. This affords an advantageous grip on a soft shaft. The inner race member 11 is similar to the first form described in that it is formed with an angular wedge shaped helical tooth 13, a radial end flange 14 and wrench holes 15. Manipulating recesses 18 are made on the projecting end of the sleeve 28.

Regardless of the specific forms described for clamping the inner race member on the shaft, the race member is held in concentric position on the shaft. It will afford an excellent raceway for a series of bearing rollers 33, confined in an outer race member 34.

A further sleeve modification 30 is shown in FIG. 9. This sleeve 30 differs from the original shown in FIG. 4 by having a ribbed roughened bore 31. This sleeve has a smaller original diameter by closing or reducing the split 32 in the free form, and omitting the spanner wrench slots. This sleeve 30 within the inner race member 11 can be lightly pushed over the shaft, opening the split, and when located in position grips the shaft to prevent rotation of the sleeve while a spanner wrench applied to the inner race member and torque applied will provide the rotation for wedging action of the teeth to take place thereby locking the race assembly in position.

While the preferred forms of the invention have been described and illustrated by way of example, many variations in materials and proportions may be made within the scope of the appended claims.

What I claim is:

1. In combination with an antifriction bearing including an outer race member, a series of antifriction elements and an inner race member having on its interior surface a continuous laterally sloped helix, both race members being of light sheet metal, a split sleeve member having an oppositely sloped helix on its outer surface complementary to said first named helix, an abutment on one of said members and means for effecting movement of the sleeve angularly in contact with said abutment and consequent partial axial separation between the helices of said sleeve and race member.

2. In combination with an antifriction bearing including an outer race member, a series of antifriction elements and an inwardly flanged inner race member having on its interior surface a continuous laterally sloped helix, both race members being of light sheet metal, a split sleeve having an oppositely sloped helix on its outer surface complementary to said first named helix, and means for effecting relative movement of the sleeve angularly in contact with the flange of the inner race and consequent partial axial separation between the helices of said sleeve and inner race member.

3. In combination with an antifriction bearing including an outer race member, a series of antifriction elements and an inner race member having on its interior surface a continuous laterally sloped helix, both race members being of light sheet metal, an outwardly flanged split sleeve having an oppositely sloped helix on its outer surface complementary to said first named helix and means for effecting relative movement of the sleeve angularly in contact with the flange of the inner race and consequent partial axial separation between the helices of said sleeve and inner race member.

4. In combination with an antifriction bearing including outer and inner race members of light sheet metal and a series of antifriction elements, a shaft mounting therefor comprising a continuous laterally sloped helix on the interior surface of the inner race member, a split sleeve having an oppositely sloped helix on its outer surface complementary to said first named helix, shaft engaging means on the inner surface of the sleeve and adapted for relative angular adjustment and consequent partial separation between the helices of said sleeve and the inner race member.

5. In combination with an antifriction bearing including outer and inner race members of light sheet metal and a series of antifriction elements, a shaft mounting therefor comprising a continuous laterally sloped helix on the interior surface of the inner race member, a split sleeve of uniform thickness having a sloped helix on its outer surface complementary to said first named helix, a like sloped helix on its inner surface, and said sleeve and race member being adapted for relative angular adjustment and consequent partial separation between the outer helix of the sleeve and the inner race member.

6. In combination with an antifriction bearing including outer and inner race members of light sheet metal and a series of antifriction elements, a shaft mounting therefor comprising a continuous laterally sloped helix on the interior surface of the inner race member, a split sleeve having a sloped helix on its outer surface complementary to said first named helix, said shaft mounting having a rough shaft-engaging inner surface and said sleeve and inner race member being adapted for relative angular adjustment and consequent partial separation between the outer helix of the sleeve and the inner race member.

7. In combination, a roller bearing comprising inner and outer race members of light sheet metal and intermediate antifriction elements, said inner race member having on its interior cylindrical surface a continuous laterally sloped helix, a cylindrical split sleeve having an external continuous laterally sloped helix interfitting the helix of the race member, one of said sleeve and inner race member having an end abutment flange, and said sleeve and inner race member being adapted for relative angular adjustment and consequent partial separation between the outer helix of the sleeve and the inner race member.

8. A clamping means for a shaft comprising a cylindrical outer member of light sheet metal having on its interior surface a continuous laterally sloped helix, a cylindrical split sleeve member of light sheet metal having the external laterally sloped helix interfitting the helix of the outer member, one of said members having an end abutment flange for the other member and said outer member and sleeve member being adapted for relative angular adjustment and consequent partial separation.

9. A clamping means for a shaft comprising a cylindrical outer member of light sheet metal having on its interior surface a continuous laterally sloped helix, an obliquely split sleeve member of light sheet metal having an external laterally sloped helix interfitting the helix of the outer member, one of said members having an end abutment flange for the other member and said outer member and sleeve member being adapted for relative angular adjustment and consequent partial separation.

References Cited in the file of this patent

UNITED STATES PATENTS

| | | |
|---|---|---|
| 736,095 | Hecht | Aug. 11, 1903 |
| 1,251,449 | Vorraber | Dec. 25, 1917 |
| 1,487,534 | Bunten | Mar. 18, 1924 |
| 3,033,600 | Drysdale | May 8, 1962 |